United States Patent [19]

Stewart, Jr.

[11] Patent Number: 5,079,840
[45] Date of Patent: Jan. 14, 1992

[54] KNIFE AND HOLDER

[76] Inventor: Isaac Stewart, Jr., 71 Sheridan St., NE., Washington, D.C. 20011

[21] Appl. No.: 557,734

[22] Filed: Jul. 26, 1990

[51] Int. Cl.⁵ .............................................. A47J 43/28
[52] U.S. Cl. ........................................ 30/148; 30/142
[58] Field of Search ................ 30/124, 148, 142, 114; 99/584; 7/158, 161, 113; 17/66, 69

[56] References Cited

U.S. PATENT DOCUMENTS 1,585,533  5/1926  Coursen et al. ........................ 30/148
2,797,478  7/1957  Gebhart et al. .................. 30/114 X
4,124,937  11/1978 Gaughf, Jr. ............................ 30/229

Primary Examiner—Douglas D. Watts

[57] ABSTRACT

A knife with a holder secured at the handle. The elongated, plastic or metal holder is tapered along the lines of the knife. The end of the holder, at the cutting edge of the knife, is curved with teeth pointing downward towards the blade of the knife or the end of the holder is flat. While cutting skin and fat from poultry and meats, the individual grips or holds the skin or fat for easy disposal.

3 Claims, 2 Drawing Sheets

KNIFE AND HOLDER

BACKGROUND OF THE INVENTION

1. Field of the Invention

The field of invention pertains to a new cutting and skinning implement for use in removing skin and fat from poultry and other meats.

2. Description of the Prior Art

Knives are utilized for a variety of applications in varying environments. Individuals utilizing cutting implements of the prior art had to remove skin and fat from poultry and meats with one hand while cutting with the other. Meats held in this position tend to squirm and reposition about a support surface such as a table or cutting block. This situation could cause serious injury to hands or body. Accordingly, for health reasons, it is advised to resist the consumption of poultry skin and fats. As such, there is a need for a combined knife and holder which addresses the problem of safety and health in preparing food and in this respect the present invention substantially fills this need.

SUMMARY OF THE INVENTION

The present invention provides the individual with the capability to cut away the unwanted portions of skin and fat from poultry and meats utilizing one tool. To attain this, the present invention comprises a knife with a holder attachment secured to the handle end of the knife to assist the individual.

A further object of the present invention is the flat end for holding skin and fat or for better gripping power, a curved end with teeth. For a better understanding of the invention, references should be made to the accompanying drawings and descriptive manner in which there is illustrated preferred embodiments of the invention.

BRIEF DESCRIPTION OF THE DRAWINGS

The invention will be better understood and objects other than those set forth will become apparent when consideration is given to the following description thereof. Such description makes reference to the annexed drawings wherein.

DESCRIPTION OF THE PREFERRED EMBODIMENT

Figure 1:
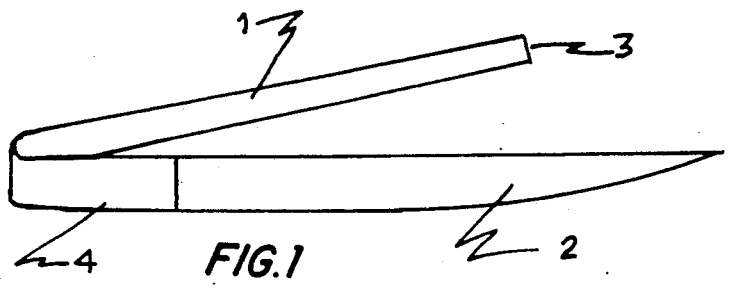
FIG. 1 is a perspective view of the instant invention with respect to the knife and holder secured at the handle.
Figure 2:
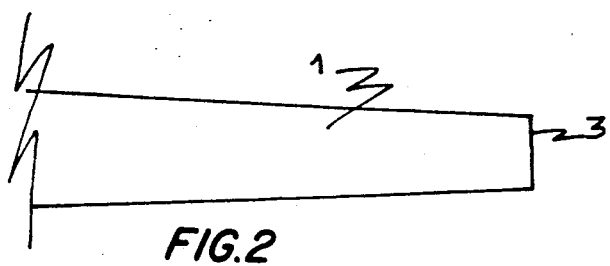
FIG. 2 is a perspective view of the holder with respect to a flat edge.
Figure 3:
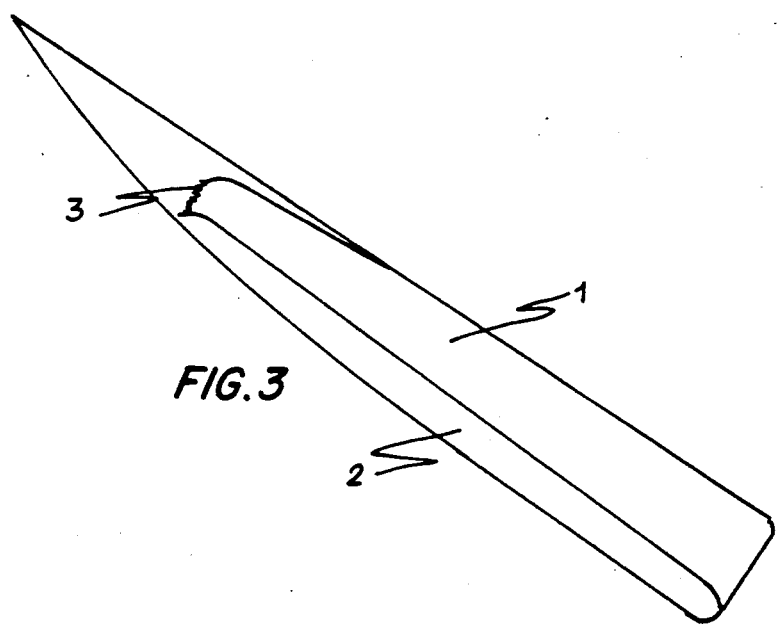
FIG. 3 is a isometric illustration of the instant invention with respect to holder and knife.
Figure 4:
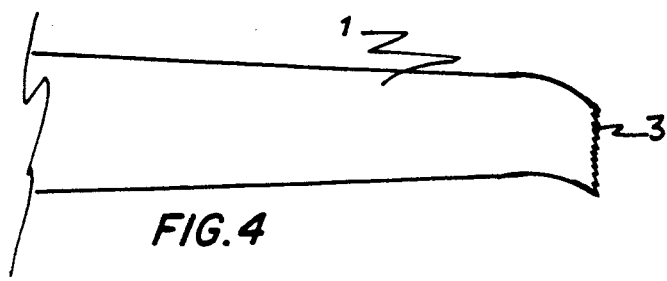
FIG. 4 is a perspective view of the holder with respect to a curved edge with teeth.
Figure 5:
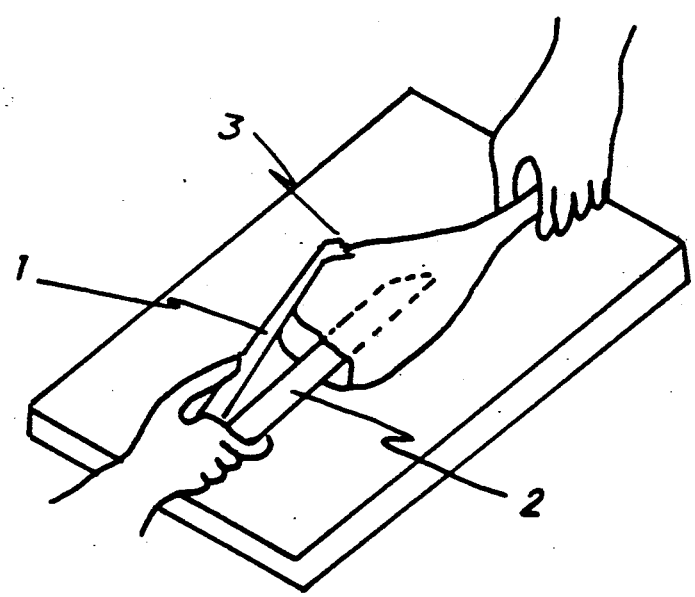
FIG. 5 is a view of the holder and knife with respect to skinning poultry.

With reference now to the drawings and in particular FIGS. 1 and 3 and 5 thereof, a new and improved knife and holder emboding the principals and concepts of the present invention will be described. A hand tool for cutting poultry skin and other meats. This tool features a knife element 2 and a holding element 1. The elongated holding element 1 is attached to the handle end 4 of the knife element. The holding element 1 is tapered and flat at the end 3 or curved with teeth at the end 3 for better gripping and holding. This hand tool allows the operator to place the knife element 2 under poultry skin for cutting while the holding element 1 is pressed downward towards the knife element for removal of the poultry skin.

The manner of usage and operation of the present invention should be apparent from the above description and accordingly no further discussion relative to the manner or usage operation will be provided. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed as being new and desired to be protected by Letters Patent of the United States is as follows:

1. A hand tool for cutting poultry skin and other meats comprising a knife element and a holding element said knife having a relatively flat blade portion with an edge extending lengthwise there along and a handle portion said holding element is attached to the handle portion of said knife element said holding element being curved with teeth at the end for gripping and holding wherein said hand tool allows the operator to place said knife element under poultry skin for cutting while said holding element is pressed downward towards said knife element for removal of skin.

2. The hand tool of claim 1 wherein said teeth of said holding element are oriented so that they point toward the flat side of said knife element.

3. The hand tool of claim 1 wherein said holding element is tapered inwardly toward the teethed end.

* * * * *